(12) United States Patent  
Pierson et al.

(10) Patent No.: US 9,129,071 B2  
(45) Date of Patent: Sep. 8, 2015

(54) COHERENCE CONTROLLER SLOT ARCHITECTURE ALLOWING ZERO LATENCY WRITE COMMIT

(71) Applicant: Texas Instruments Incorporated, Dallas, TX (US)

(72) Inventors: Matthew D Pierson, Murphy, TX (US); Kai Chirca, Dallas, TX (US); Timothy D Anderson, University Park, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 93 days.

(21) Appl. No.: 14/057,205

(22) Filed: Oct. 18, 2013

(65) Prior Publication Data

US 2014/0115271 A1     Apr. 24, 2014

Related U.S. Application Data

(60) Provisional application No. 61/717,872, filed on Oct. 24, 2012.

(51) Int. Cl.

| G06F 12/08 | (2006.01) |
|---|---|
| G06F 13/42 | (2006.01) |
| G06F 13/16 | (2006.01) |
| H04L 29/06 | (2006.01) |

(52) U.S. Cl.  
CPC ............ *G06F 13/42* (2013.01); *G06F 12/0815* (2013.01); *G06F 12/0828* (2013.01); *G06F 12/0831* (2013.01); *G06F 13/1626* (2013.01); *G06F 13/1663* (2013.01); *H04L 63/0263* (2013.01); *Y02B 60/1225* (2013.01)

(58) Field of Classification Search  
USPC .................................................. 711/141–146  
See application file for complete search history.

(56) References Cited

U.S. PATENT DOCUMENTS

| 5,890,217 A * | 3/1999 | Kabemoto et al. ............ 711/141 |
| 6,397,302 B1 * | 5/2002 | Razdan et al. ................ 711/141 |
| 8,868,847 B2 * | 10/2014 | Gonion ........................ 711/146 |

* cited by examiner

*Primary Examiner* — Tammara Peyton  
(74) *Attorney, Agent, or Firm* — Robert D. Marshall, Jr.; Frank D. Cimino

(57) ABSTRACT

This invention speeds operation for coherence writes to shared memory. This invention immediately commits to the memory endpoint coherence write data. Thus this data will be available earlier than if the memory controller stalled this write pending snoop responses. This invention computes write enable strobes for the coherence write data based upon the cache dirty tags. This invention initiates a snoop cycle based upon the address of the coherence write. The stored write enable strobes enable determination of which data to write to the endpoint memory upon a cached and dirty snoop response.

10 Claims, 7 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

| 31 ∘∘∘ 29 | 28 | 27 ∘∘∘ 23 | 22 ∘∘∘ 18 | 17 ∘∘∘ 13 | 12 ∘∘∘ 2 | 1 | 0 |
|---|---|---|---|---|---|---|---|
| creg | z | dst | src2 | scr1/cst | opcode | s | p |

COHERENCE CONTROLLER SLOT ARCHITECTURE ALLOWING ZERO LATENCY WRITE COMMIT

CLAIM OF PRIORITY

This application claims priority under 35 U.S.C. 119(e)(1) to U.S. Provisional Application No. 61/717,872 filed Oct. 24, 2012.

TECHNICAL FIELD OF THE INVENTION

The technical field of this invention is cache for digital data processors.

BACKGROUND OF THE INVENTION

This invention concerns multi-core data processing systems. It is typical in such multi-core systems for each core to have its own local cache memory and for all the cores to share a common higher level memory. This could be a memory on the same integrated circuit as the multiple cores (on chip) or an external memory (off chip). In such a multi-core data processing system more than one core may write to the same higher level memory. A multi-core shared memory controller must coordinate memory traffic between the multiple cores and the shared memory.

This task includes contrary goals of maintaining coherence and suitable memory access latency. Each time one of the multiple cores updates a cache entry corresponding to an address in shared memory, the multi-core shared memory controller must insure that other cores operate upon the latest version of the data. Conflicts may occur if the data is cached by more than one core. The prior art typically handles this by a snoop cycle. The multi-core shared memory controller polls (snoops) the caches of other cores to determine whether they store the address of interest. The response may be no, the cache doesn't store the data. Upon a yes response, meaning the cache stores the data, the remote cache determines if its cache data is dirty. A dirty cache entry is one that has been updated locally since the last update to the shared memory. If the remote cache entry is clean, then it signals the multi-core shared memory controller. This situation presents no conflict with the operation triggering the snoop. If the remote cache entry is dirty, the multi-core shared memory controller must reconcile the data stored in the two (or more) caches. It is possible that the separate caches have updated the same cache line but not the same data. In this case the dirty portion of the cache lines should be merged before writing to the shared memory. If the separate caches updated the same date, they need to be written to the shared memory in proper order to maintain coherence.

SUMMARY OF THE INVENTION

This invention speeds operation for coherence writes to the shared memory. One prior art technique stalls writing the coherence data pending snoop responses. This typically prevents the endpoint memory from servicing any other accesses during the wait for snoop responses. An alternate prior art technique commits the write immediately and stores the coherence write data pending snoop responses for reconciliation. This prior art technique requires storing a lot of data for the snoop reconciliation. This invention immediately commits to the memory endpoint the coherence write data. Thus this data will be available earlier than if the memory controller stalled this write pending snoop responses. This invention computes write enable strobes for the coherence write data based upon the cache dirty tags. Determination of write enable strobes for this data write was a typical feature of the prior art. This invention stores only the write byte enable strobes rather than both these strobes and the coherence data for snoop data reconciliation. These stored write enable strobes enable determination of which data to write to the endpoint memory upon a cached and dirty snoop response.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
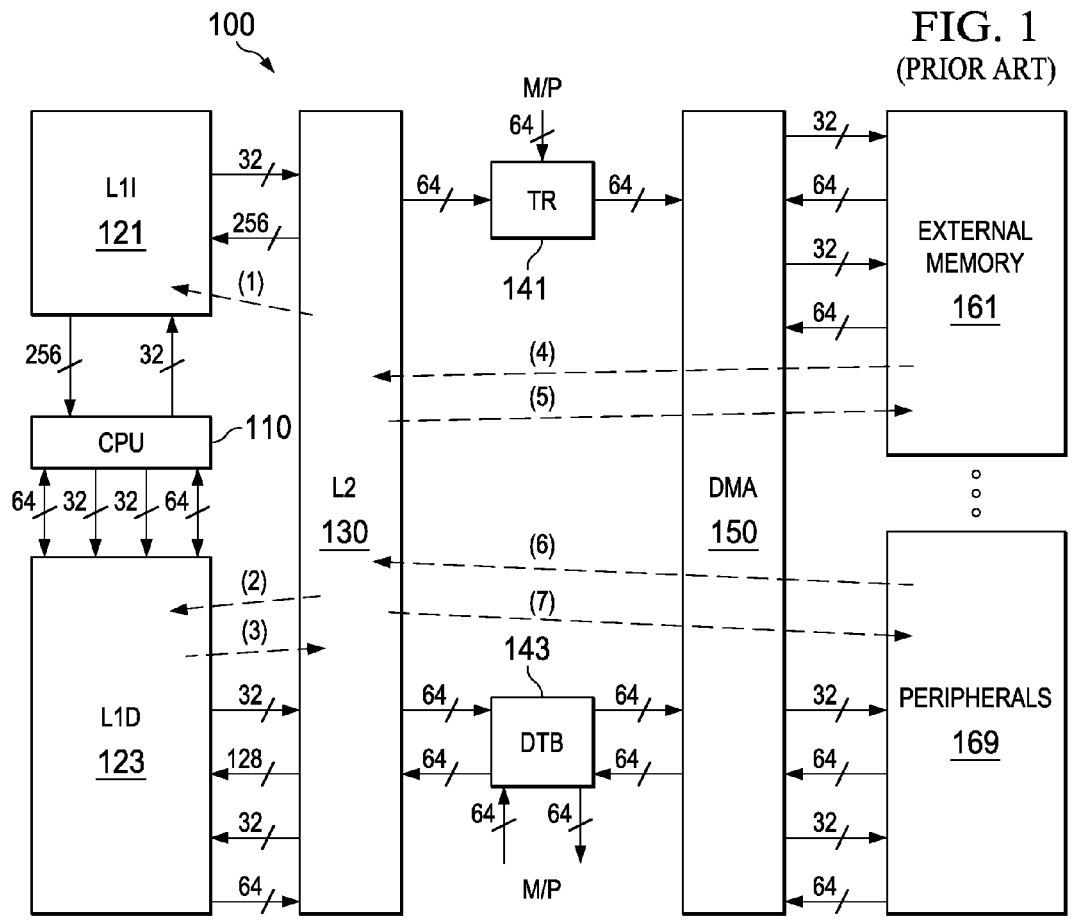
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically include a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

FIG. 1 illustrates several data/instruction movements within the digital signal processor system 100. These include: (1) instructions move from L2 cache 130 to L1I cache 121 to fill in response to a L1I cache miss; (2) data moves from L2 cache 130 to L1D cache 123 to fill in response to a L1D cache miss; (3) data moves from L1D cache 123 to L2 cache 130 in response to a write miss in L1D cache 123, in response to a L1D cache 123 victim eviction and in response to a snoop from L2 cache 130; (4) data moves from external memory 161 to L2 cache 130 to fill in response to L2 cache miss or a direct memory access (DMA) data transfer into L2 cache 130; (5) data moves from L2 cache 130 to external memory 161 in response to a L2 cache victim eviction or writeback and in response to a DMA transfer out of L2 cache 130; (6) data moves from peripherals 169 to L2 cache 130 in response to a DMA transfer into L2 cache 130; and (7) data moves from L2 cache 130 to peripherals 169 is response to a DMA transfer out of L2 cache 130.

Figure 2:
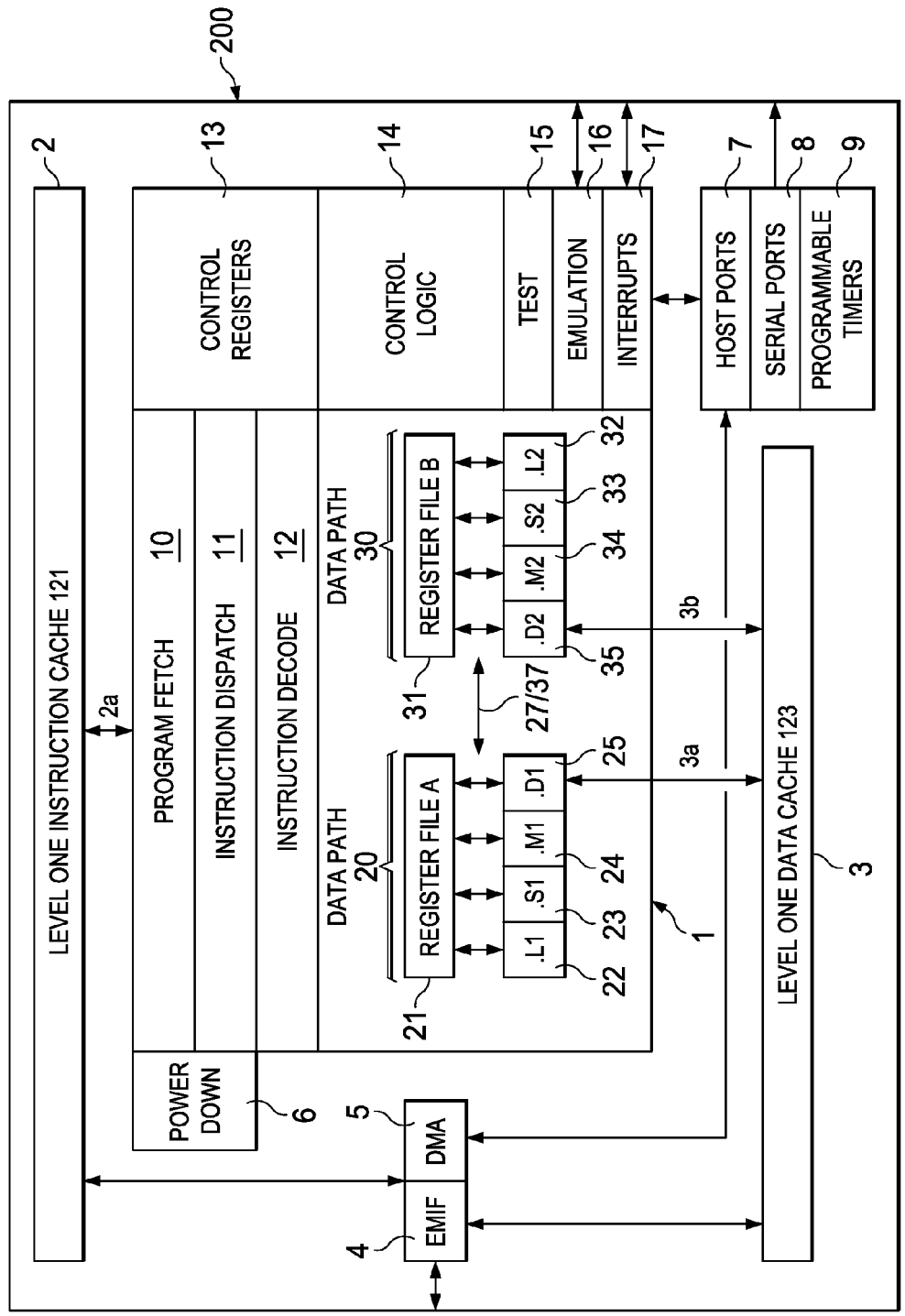
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
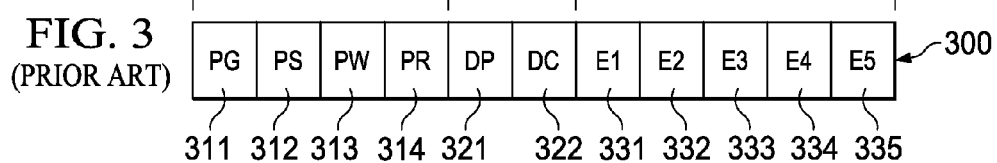
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figures 4, 5:
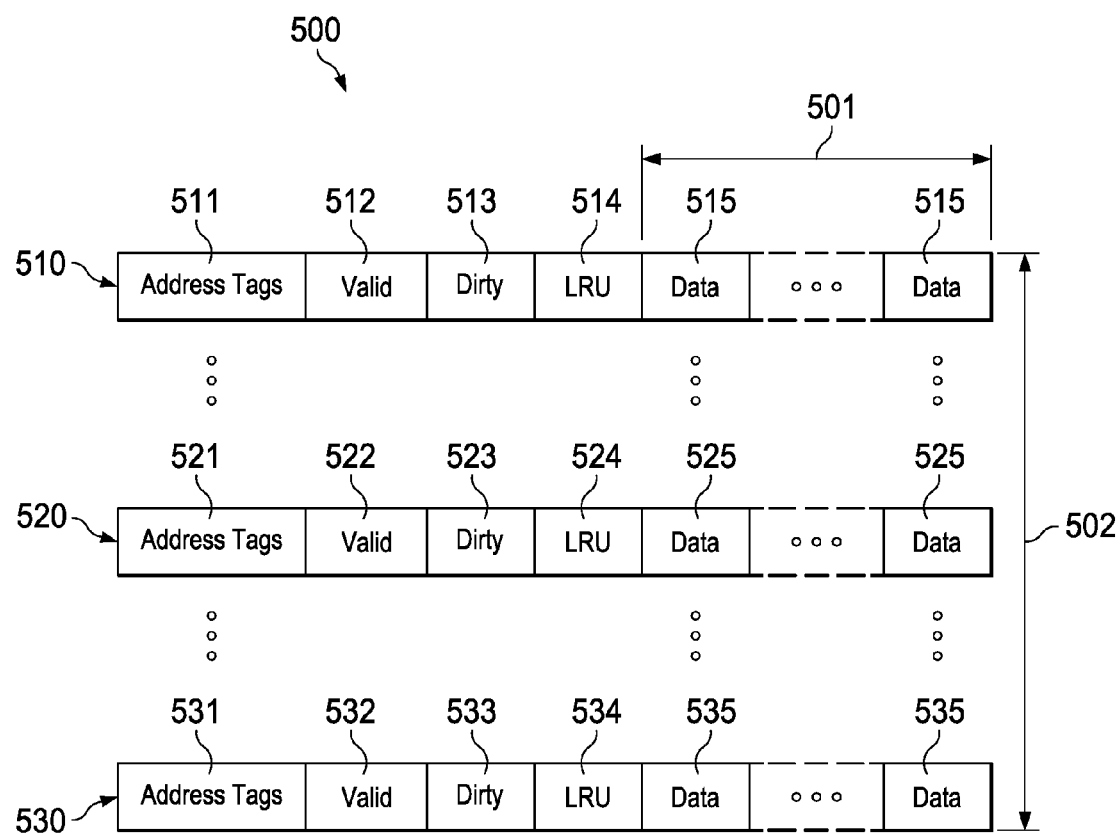
FIG. 4 illustrates the instruction syntax of the very long instruction word digital signal processor core illustrated in FIG. 2 (prior art)
FIG. 5 illustrates the details of a set of typical prior art cache lines (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

|  | Conditional Register | | | |
|---|---|---|---|---|
|  | creg | | | z |
|  | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the details of plural cache lines such as used in L1I cache 121, L1D cache 123 and L2 cache 130 illustrated in FIG. 1. Cache 500 illustrated in FIG. 5 includes cache lines 510, 520 and 520 that are representative of the internal structure of cache 500. Each of cache lines 510, 520 and 530 includes: respective address tags 511, 521 and 522; respective valid bits 512, 522 and 523; respective dirty bits 513, 523 and 533; respective least recently used (LRU) indicators 514, 524 and 534; and respective data words 515, 525 and 535. Each cache line 510, 520 and 530 includes plural respective data words 515, 525 and 535. The bit length of data words 515, 525 and 535 is set by the minimal addressable data amount of CPU 110. This is typically 8 bits/1 byte.

Cache 500 stores data from more distant memories such as external memory 161 which are accessed by a multi-bit address. Cache 500 is organized to facilitate this storage and to facilitate finding such data in the cache. Each cache line 510, 520 and 530 typically stores $2^N$ respective data words 515, 525 and 535, when N is an integer. The position of data words 515, 525 and 535 within the corresponding cache line 510, 520 and 530 along the dimension 501 serves as a proxy for the least significant bits of the address.

The position of cached data within lines along dimension 502 serves as a proxy for the next most significant bits of the address. The corresponding address tags 511, 521 and 531 form the remainder of the data word address. To determine if a memory access is to data cached within cache 500 (a cache hit), cache 500 compares the address tags for all cache lines to the most significant bits of the memory location accessed. Upon a detecting a match, the position within the cache line along dimension 501 corresponds to the least significant bits of the address permitting identification of the data word accessed.

Each cache line 510, 520 and 530 includes a corresponding valid bit 512, 522 and 532. A first state of this valid bit indicates the corresponding data words 515, 525 or 535 are valid. An opposite state of this valid bit indicates the corresponding data words 515, 525 or 535 are not valid. There are several instances where data stored within cache 500 would not be valid. Upon initial activation of digital signal processor system 100 the L1I cache 121, L1D 123 cache and L2 cache 130 would not be loaded. Thus they would not store valid data. Accordingly, all cache lines are initially marked invalid. During a cache access a match of a requested address with address tags 511, 521 or 531 would not detect a match unless the corresponding valid bit 512, 522 or 532 indicated the data was valid.

Each cache line 510, 520 and 530 includes a corresponding dirty bit 513, 523 and 533. A first state of this valid bit indicates the corresponding data words 515, 525 or 535 are dirty. An opposite state of this valid bit indicates the corresponding data words 515, 525 or 535 are not dirty (clean). Cache memory is generally used for both read accesses and write accesses. Upon a cache hit for a write access, the write data is written into the corresponding location within cache 500. According to the preferred writeback technique, this write data is not immediately forwarded to external memory 161. Instead the respective dirty bit 513, 523 or 533 is set to indicate dirty. A dirty indication means that there has been a write to the cached data not currently reflected in the base memory. According to the writeback technique this data is written to the base memory with the expectation that this writeback can accumulate plural writes to the memory location and nearby memory locations within the same cache line to reduce traffic on the bus to external memory 161.

It is known in the art to include valid and dirty indicators for quantities of data less than an entire cache line 510, 520 and 530. In this event, each cache line 510, 520 and 530 has tags including plural valid and dirty indicators. It is customary for the quantity of data covered by these valid and dirty tags to be an integral power of 2 and for there to be an integral power of 2 of these quantities within a cache line. Using this technique each of plural sets of valid and dirty indicators store the status for a predetermined portion of the cache line.

The least recently used (LRU) bits 514, 524 and 534 are used when a cache line is replaced. Because the cache cannot hold all the data stored in the large, slow memory, the data within the cache must be replaced with new data regularly. Using a data words location within dimensions 501 and 502 as proxy for the least significant bits introduces a problem in locating data within cache 500. If there is only a single cache line having the same location on dimensions 501 and 502, then plural data from the large, slow memory will alias to the same cache line in cache 500. This is data having the same least significant address bits corresponding to dimensions 501 and 502 but differing most significant address bits. An access to such aliased data would require the previous data at that cache line to be replaced. This is considered disadvantageous. A typical prior art cache is set associative. Thus a set of cache lines have the same location on dimensions 501 and 502. Typical sets include two members (two-way set associative) or four members (four-way set associative). Each cache line of such a set is called a way. A cache miss to an address that aliases to one of these sets needs only to evict one of these ways. Determination of which way to evict is typically made based on prior usage of these ways. According to both the temporal and spatial locality principles more recently used cache ways are more likely to be reused than less recently used cache ways. LRU bits 514, 524 and 534 track accesses to cache ways within the set. When data is to be replaced the LRU bits indicate the least recently used way for replacement. Maintaining cache coherence requires writeback of a dirty way upon such replacement.

Figure 6:
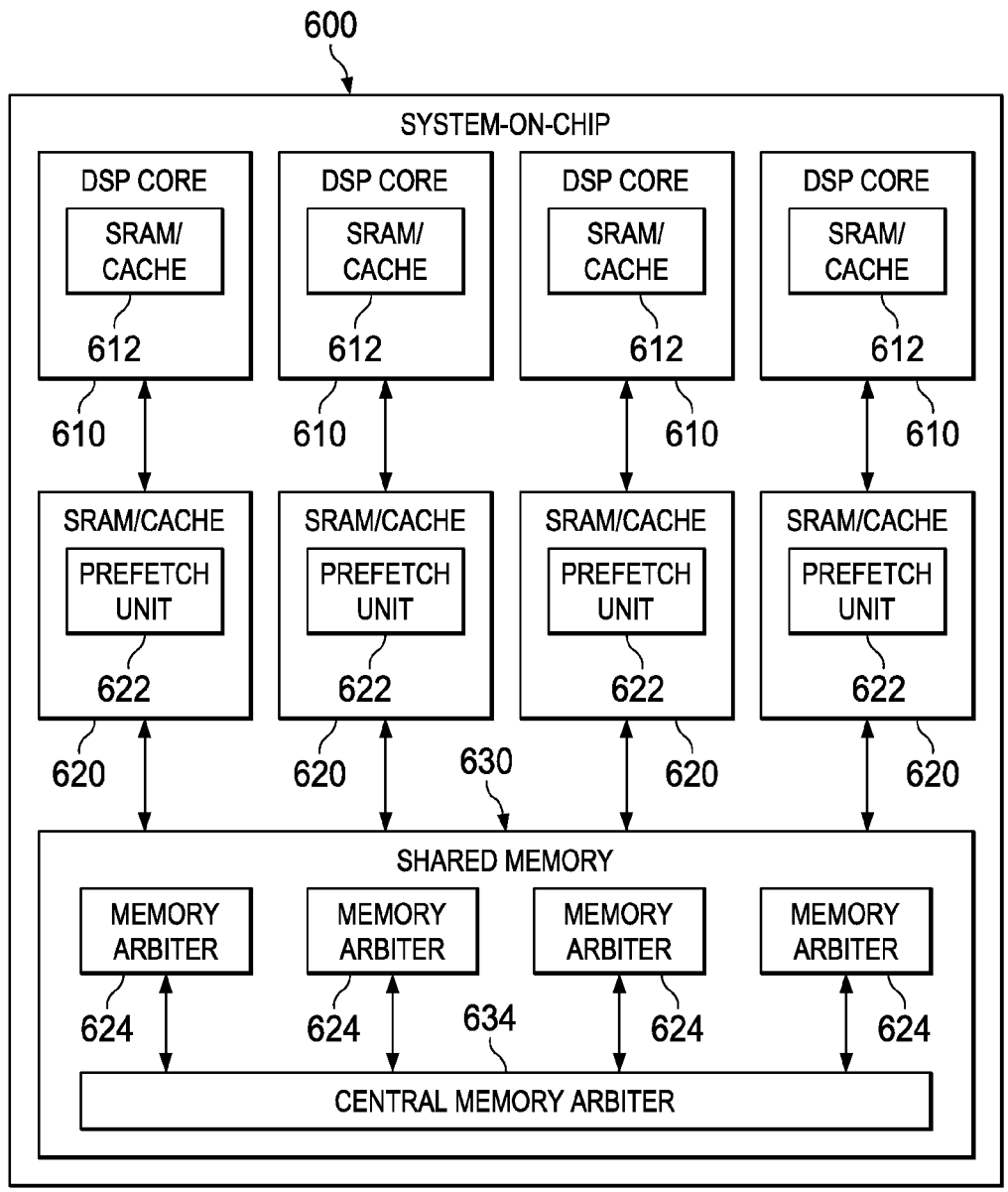
FIG. 6 illustrates a computing system including a local memory arbiter according to an embodiment of the invention.

FIG. 6 is a block diagram illustrating a computing system including a local memory arbiter according to an embodiment of the invention. FIG. 6 illustrates system on a chip (SoC) 600. SoC 600 includes one or more DSP cores 610, SRAM/Caches 620 and shared memory 630. SoC 600 is preferably formed on a common semiconductor substrate. These elements can also be implemented in separate substrates, circuit boards and packages. For example shared memory 630 could be implemented in a separate semiconductor substrate. FIG. 6 illustrates four DSP cores 610, but SoC 600 may include fewer or more DSP cores 610.

Each DSP core 610 preferably includes a level one data cache such as L1 SRAM/cache 612. In the preferred embodiment each L1 SRAM/cache 612 may be configured with selected amounts of memory directly accessible by the corresponding DSP core 610 (SRAM) and data cache. Each DSP core 610 has a corresponding level two combined cache L2 SRAM/cache 620. As with L1 SRAM/cache 612, each L2 SRAM/cache 620 is preferably configurable with selected amounts of directly accessible memory (SRAM) and data cache. Each L2 SRAM/cache 620 includes a prefetch unit 622. Each prefetch unit 622 prefetches data for the corresponding L2 SRAM/cache 620 based upon anticipating the needs of the corresponding DSP core 610. Each DSP core 610 is further coupled to shared memory 630. Shared memory 630 is usually slower and typically less expensive memory than L2 SRAM/cache 620 or L1 SRAM/cache 612. Shared memory 630 typically stores program and data information shared between the DSP cores 610.

In various embodiments, each DSP core 610 includes a corresponding local memory arbiter 624 for reordering memory commands in accordance with a set of reordering rules. Each local memory arbiter 624 arbitrates and schedules memory requests from differing streams at a local level before sending the memory requests to central memory arbiter 634. A local memory arbiter 624 may arbitrate between more than one DSP core 610. Central memory arbiter 634 controls memory accesses for shared memory 630 that are generated by differing DSP cores 610 that do not share a common local memory arbiter 624.

To maintain coherence in systems with multiple, a shared memory a multi-core shared memory controller needs to enforce a strict ordering policy on coherent data. This strict ordering allows the multiple masters to operate on the same data set. This strict order is most critical when committing updates to the memory endpoint. Before a coherent write can be committed the multi-core shared memory controller must determine that all other previous updates (in time) to the same memory location have completed.

Typical coherent memory controllers will stall the write until all coherent masters can be snooped to invalidate and/or writeback their older data. While the snoop is outstanding the write can either stall the memory endpoint or be stored in a queue waiting to commit once the snoop returns. Stalling the memory endpoint slows system operation. Saving an entire cache line which may be 64 bytes of data is hardware expensive.

Figure 7:
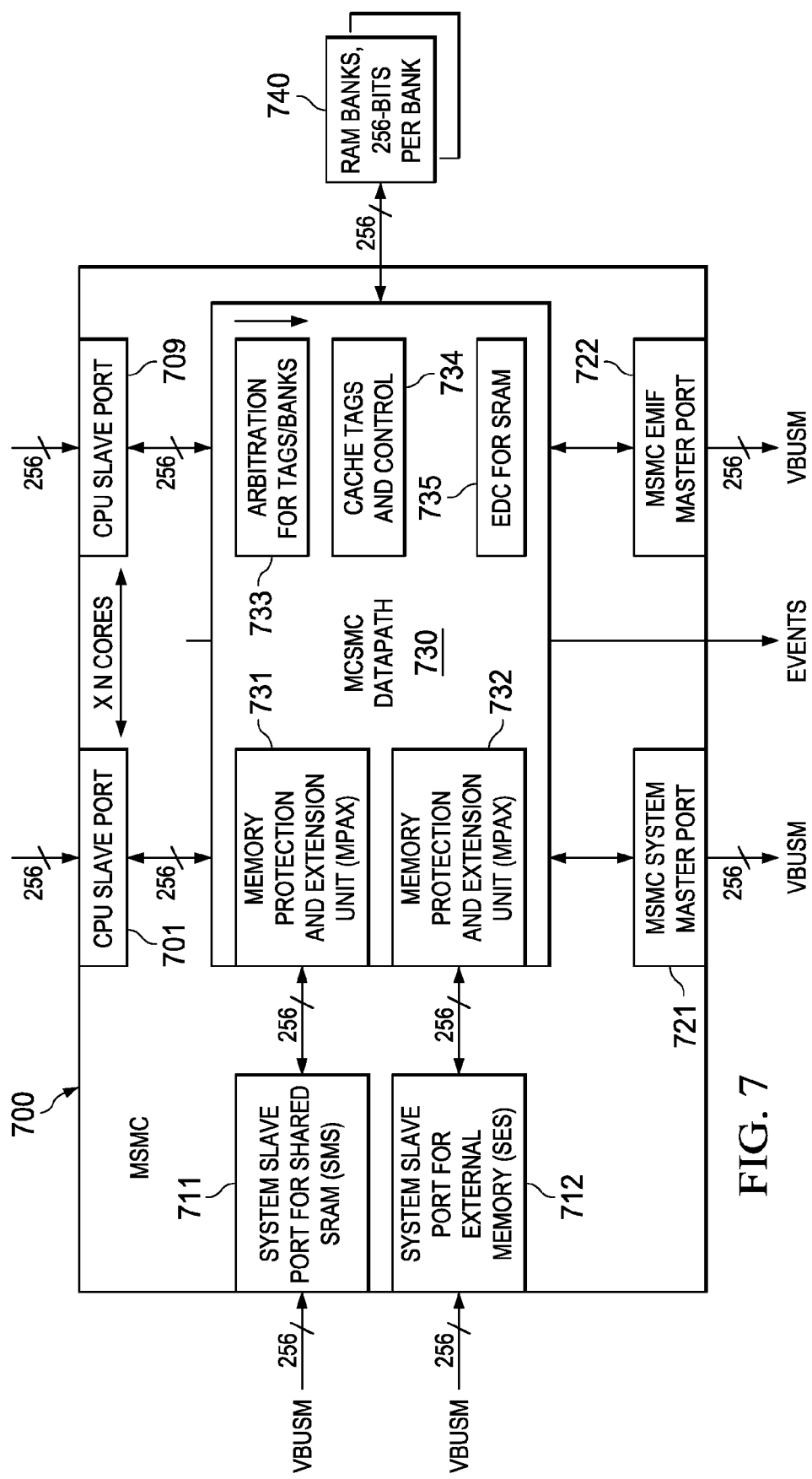
FIG. 7 illustrates a preferred embodiment of the multi-core shared memory controller of this invention.

FIG. 7 illustrates a preferred embodiment of the multi-core shared memory controller of this invention. Multi-core shared memory controller (MSMC) 700 includes; plural slave interfaces for CPU cores 701 to 709; two full VBusM slave interfaces for connections to the SoC interconnect, a first system slave port for shared SRAM (SMS) 711 and a second system slave port for external SRAM (SES) 712; MSMC system master port 721; MSMC external memory interface (EMIF) 722; and MSMC master control data path 730. MSMC master control data path 730 includes: memory protection and extension unit (MPAX) 731 coupled to system slave port for shared SRAM (SMS) 711; and memory protection and extension unit (MPAX) 732 coupled to system slave port for external memory (SES) 712. MSMC master control data path 730 includes: arbitration for tags/banks 733; cache tags and control 734; and error detection and correction (EDC) 735. MSMC master control data path 730 is bidirectionally coupled to RAM banks 740. MSMC 700 controls communication between plural processing cores, external peripherals and memory. In particular MSMC 700 controls memory operations to maintain coherence when plural processing cores employ the same shared memory.

Figure 8:
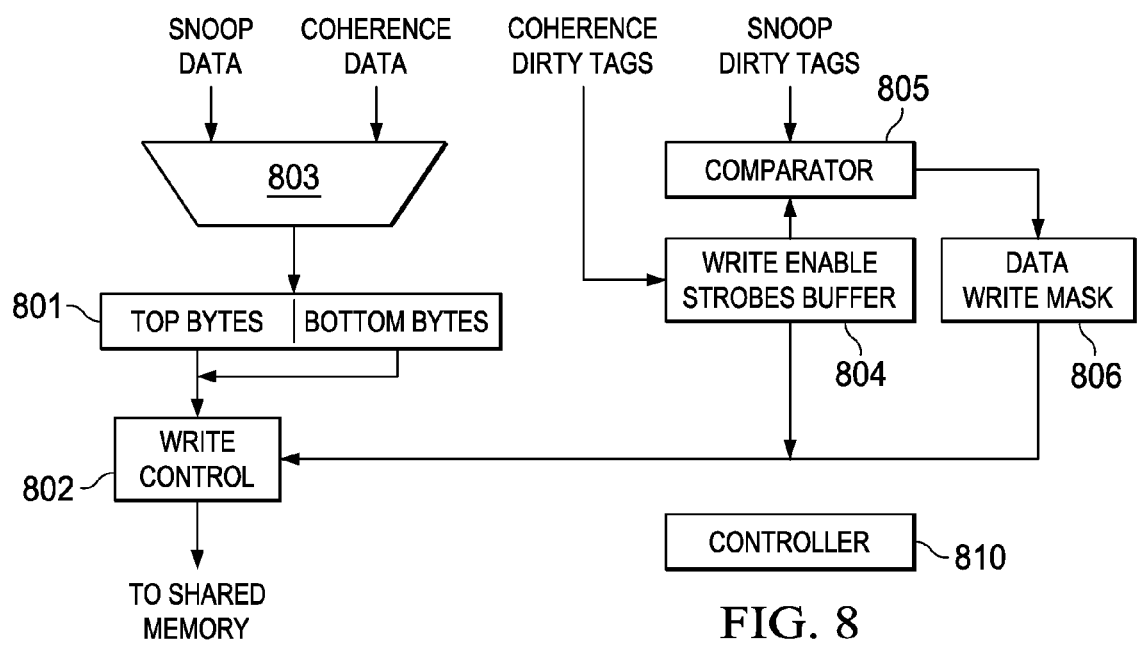
FIG. 8 illustrates a detail of one embodiment of a portion of the multi-core shared memory controller of constructed to practice this invention.

FIG. 8 illustrates a detail of one embodiment of a portion of MSMC 700 constructed to practice this invention. Controller 810 controls operation of the parts illustrated in FIG. 8.

In accordance with the preferred embodiment of this invention, the largest cache line size is twice the data width to the shared memory. Write buffer 801 separately stores top bytes and bottom bytes of the data to be written to the shared memory. Write control 802 is responsive to half the data stored in write buffer 801 (top or bottom bytes) and write enable strobes described later to write data to the shared memory. Write control 802 uses two consecutive cycles to write the data in write buffer 802.

In practicing this invention write buffer 801 may store coherence data from a cache coherence operation or snoop data from a snoop response as selected by multiplexer 803. FIG. 8 illustrates only parts relevant to this invention. A practical system would enable other sources of data for write buffer 801.

Write enable strobes buffers 804 is preferably a multi-entry buffer storing write enable strobes for writing coherence data to the shared memory. Prior art memory systems having wide data paths typically write data to the endpoint memory cells using the write enable strobes as a mask. The actual write operation takes place for only a part of the wide data path indicated by a corresponding write enable strobe. Prior art memory systems are typically byte (8-bit) addressable meaning the smallest amount of data to be manipulated is a byte. It is also typical to provide write enable strobes on a byte basis. Many data writes need change only a part of the wide data path in the memory. The write enable strobes mark the data to be written to the endpoint memory cells. These write enable strobes permit a reduction in power consumption during the write operation. Only those circuits corresponding to the data actually being changed need be powered during the write operation. In the preferred embodiment these write enable strobes are determined from the dirty tags as shown in FIG. 8. A dirty data indication enables the corresponding write enable strobes. A clean data indication disables the corresponding write enable strobes. The quantity of data having a corresponding dirty indicator in the tags may differ from the quantity of data for an individual write enable strobe. Typically a tag quantity will be larger than the write enable strobe quantity. A dirty tag causes active write enable strobes for the entire tag data quantity. Write enable strobes buffers 804 stores plural of these write enable strobe sets until retired at the completion of a snoop operation as describe below.

Comparator 805 compares write enable strobes corresponding to the dirty tags of a snoop response with the corresponding entry in the write enable strobes buffer. Preferably write enable strobes buffer includes a mechanism such as an identity tag to be able to correlate a snoop response with the write enable strobes stored for the coherence write generating the snoop operation. Data write mask 806 generates a data mask for a write of snoop data based upon the comparison of comparator 805. Write control 802 is controlled by write enable strobes from write enable strobes buffer or data write mask 806 in a manner described below.

Figure 9:
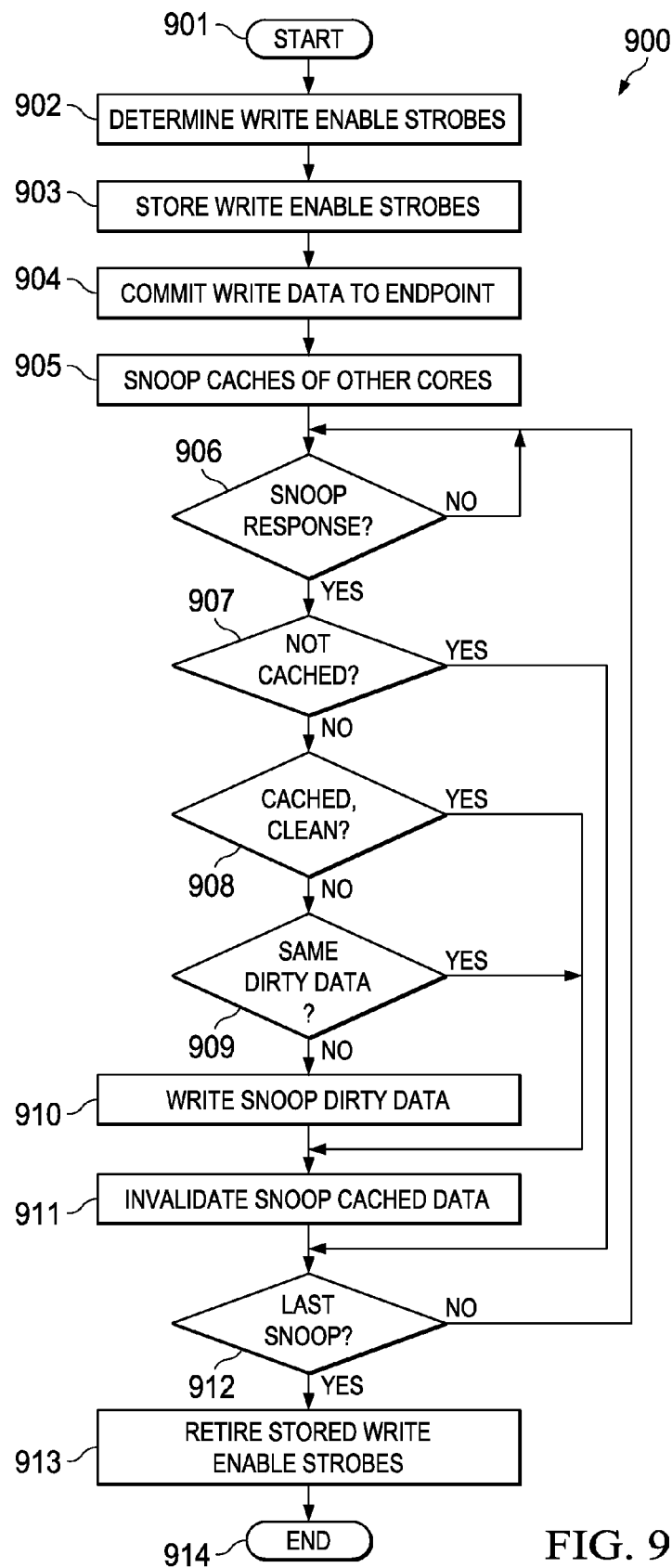
FIG. 9 illustrates operation of this invention.

FIG. 9 illustrates process 900 of this invention. This process is preferably controller by controller 810. This may be performed by a dedicated hardware state machine. Alternately this may be a microcoded function. Process 900 begins via start step 901. As noted the process of this invention requires a cache coherence operation from one of the processing cores. This will typically take place on a data read operation that generates a cache miss. On allocation of a cache line for storing the missed data, the cache line to be replaced may be dirty. If it is dirty the replaced cache line cannot be merely discarded but the dirty data must be written back to the higher level, shared memory.

MSMC 700 begins operation upon receiving the coherence write data and the corresponding tags. Step 902 determines the write enable strobes for writing this data to the shared memory endpoint. Step 903 stores these write enable strobes. As previously shown, the preferred embodiment stores the write enable strobes in a buffer with multiple entries. The preferred embodiment tags each such stored set of write enable strobes to match with return snoop responses.

Step 904 commits the write data to the endpoint. Note that the address is not shown in these figures for clarity, however the coherence write is data of a cache line having a corresponding address. This write is to the corresponding address. This will typically be a shared memory. The data write is masked by the corresponding write enable strobes. Once committed the write data is discarded and not retained.

Step 905 initiates a cache snoop cycle to other cores that cache data. This snoop cycle involves sending the address of the coherence data write from a first cache to other cores to determine whether they cache data at that address. Note that steps 903, 904 and 905 are illustrated as sequential, but may occur simultaneously or in another order.

Step 906 waits for a snoop response. If there is no snoop response (No at step 906), then process 900 returns to step 906 to wait for a snoop response.

If there is a snoop response (Yes at step 906), then process 900 determines the type of response to control further action. As known in the art there are three types of snoop response: Not Cached, the responding processing core does not store the data; Cached and Clean, the responding core stores the data but it is unchanged by that processing core; and Cached and Dirty, the responding core stores that data and has changed it since the data was last written to the shared memory. If the snoop response is that the snooped core cache does not store the corresponding data "Not Cached" (Yes at step 907), then MSMC 700 takes no action on the snoop response. Process 900 advances to step 912 to test if the snoop response was the last snoop response. MSMC 700 tracks received snoop responses to determine whether all snoop responses have been received. If the just received snoop response was not the last snoop response (No at step 912), then process 900 returns to step 906 and waits for another snoop response.

If the just received snoop response was not a "Not Cached" response (No at block 907), then process 900 tests to determine if the snoop response indicates the data is clean "Cached and Clean." If the snoop response indicates the data is tagged clean in the responding core (Yes at step 908), then MSMC 700 requires no action on the just written data (step 904). Process 900 advances to step 911. In this case process 900 assumes the just written data (step 904) is the latest data. The data stored in the cache of the core generating the current snoop response is invalidated (step 911). If that core needs this data again, this invalidation will cause a cache miss. This cache miss will be serviced by obtaining the latest data from the shared memory. Note this invalidation could be triggered at the responding processing core when the snoop response indicates the data is cached.

Process 900 then tests to determine if the current snoop response was the last snoop response (step 912). If the just received snoop response was not the last snoop response (No at step 912), then process 900 returns to step 906 and waits for another snoop response.

If the snoop response was not "Cached and Clean" (No at step 908), then the snoop response must be "Cached and Dirty." Step 909 checks to determine if the dirty data in the snoop response is the same dirty data as the data of the coherence write. In the preferred embodiment of this invention MSMC 700 compares the stored write enable strobes with correspondingly generated write enable strobes for the snoop response data. If this dirty data is the same (Yes at step 909), then MSMC 700 requires no action on the just written data (step 904). Process 900 advances to step 911. In this case process 900 assumes the just written data (step 904) is the latest data. The data stored in the cache of the core generating the current snoop response is invalidated (step 911). If that core needs this data again, this invalidation will cause a cache miss and the latest data will be recalled from the shared memory.

If this dirty data is not the same (No at step 909), then MSMC 700 updates the just written data. MSMC 700 assumes the dirty data of the coherence write is the latest data. MSMC 700 assumes that the dirty data of the snoop response that differs from the dirty data of the coherence write is also the latest data. Step 910 determines which data is dirty in the snoop response and clean in the original coherence write. Step 910 writes this data with appropriate write enable strobes to the memory endpoint. As noted above this write is to an address of the original coherence write data. This merges the originally written data (step 904) with appropriate dirty data from the current snoop response.

Process 900 advances to step 911. The data stored in the cache of the core generating the current snoop response is invalidated (step 911). Note this has been replaced with merged data from the original cache (step 904) and from the snooped cache (step 910). If that core needs this data again, this invalidation will cause a cache miss and the latest data will be recalled from the shared memory. Note this invalidation could be triggered at the responding processing core when the snoop response indicates the data is cached.

Process 900 advances to step 912 to test if the snoop response was the last snoop response. If the just received snoop response was not the last snoop response (No at step 912), then process 900 returns to step 906 and waits for another snoop response. If the current snoop response was the last snoop response (Yes at step 912), then process 900 retires the stored write enable strobes (step 913). With receipt of the last snoop response, these stored write enable strobes are no longer needed. Process 900 ends with block 914.

This invention speeds operation for coherence writes to the shared memory. One prior art technique stalls writing the coherence data pending snoop responses. This typically prevents the endpoint memory from servicing any other accesses during the wait for snoop responses. An alternate prior art technique commits the write immediately and stores the coherence write data pending snoop responses for reconciliation. This prior art technique requires storing a lot of data for the snoop reconciliation. This invention immediately commits to the memory endpoint the coherence write data. Thus this data will be available earlier than if the memory controller stalled this write pending snoop responses. This invention computes write enable strobes for the coherence write data based upon the cache dirty tags. Determination of write enable strobes for this data write was a typical feature of the prior art. This invention stores only the write byte enable strobes rather than both these strobes and the coherence data for snoop data reconciliation. These stored write enable strobes enable determination of which data to write to the endpoint memory upon a cached and dirty snoop response.

What is claimed is:

1. A multi-core shared memory controller for managing memory coherence among a plurality of processing cores which may cache data and a shared memory comprising:
   a plurality of input ports, one corresponding to each one of the plurality of processing cores, for receiving coherence write data, corresponding write coherence data dirty tags, snoop response data and corresponding snoop response data dirty tags, said dirty tags including a plurality of bits, each bit indicating a clean/dirty state of a corresponding portion of the corresponding data;
   an output buffer for storing write data to be stored in the shared memory;
   a write enable strobe buffer storing said dirty tags corresponding to coherence write data;
   a comparator connected to said write enable strobe buffer and receiving said snoop response data dirty tags corresponding to snoop response data, said comparator determining where snoop response data dirty tags indicate dirty and said stored dirty tags indicate clean;
   a write control connected to said comparator and receiving data and dirty tags operable to
      write only portions of received coherence write data indicated dirty by said corresponding coherence write data dirty tags to the shared memory, and
      write portions of received snoop response data that is dirty in the snoop response data and clean in the coherence write data to the shared memory.

2. The multi-core shared memory controller of claim 1, wherein:
   said write enable strobe buffer is operable to
      generate write enable strobes corresponding to said coherence write data dirty tags of said coherence write data, and
      store said write enable strobes; and
   said write control is further operable to write said portions of said coherence write data to the shared memory by supplying said coherence write data and said stored write enable strobes to the shared memory.

3. The multi-core shared memory controller of claim 2, wherein:
   said comparator is further operable to
      generate write enable strobes corresponding to snoop response data dirty tags, and
      compare the write enable strobes corresponding to the snoop response data dirty tags with said stored write enable strobes,
      generate combined write enable strobes active where said write enable strobes corresponding to the snoop response data dirty tags are active and said stored write enable strobes are inactive and are inactive elsewhere, and
      supply said combined write enable strobes to said write control.

4. The multi-core shared memory controller of claim 1, wherein:
   said write enable strobe buffer comprises plural entries each storing coherence write data dirty tags of a corresponding one of plural coherence write data in plural buffer entries together with identity information;

said comparator step is further operable to
  generate write enable strobes corresponding to said snoop response data dirty tags, and
  compare write enable strobes corresponding to said coherence write data dirty tags of a received snoop response data with an entry of a corresponding stored write enable strobes via said identity information.

5. The multi-core shared memory controller of claim 4, further comprising:
said write enable strobe buffer is further operable to
  determine when all other processing cores have responded to a snoop request; and
  retire an entry of stored write enable strobes when all other processing cores have responded to a snoop request of the corresponding coherence write data.

6. A method of coherence management for a plurality of processing cores which may cache data and a shared memory comprising the steps of:
  receiving coherence write data and corresponding coherence write data dirty tags from a first processing core;
  writing only portions of said coherence write data indicated dirty by said corresponding coherence write data dirty tags to the shared memory;
  storing the corresponding coherence write data dirty tags;
  initiating a cache snoop operation to other processing cores of the plurality of processing cores;
  invalidating a cache entry in a snooped processing core that caches the snooped data;
  writing portions of said snoop response data that is indicated dirty in the snoop response data and indicated clean in the coherence write data.

7. The method of claim 6, wherein:
said step of storing the coherence write data dirty tags comprises
  generating write enable strobes corresponding to said coherence write data dirty tags, and
  storing the write enable strobes; and
said step of writing said portions of said coherence write data to the shared memory includes supplying said coherence write data and said write enable strobes to the shared memory causing said shared memory to write data where the corresponding write enable strobes are active and not write data where the corresponding write enable strobes are inactive.

8. The method of claim 7, wherein:
said step of writing said portions of said snoop response data that is dirty in the snoop response data and clean in the coherence write data to the shared memory comprises
  generating write enable strobes corresponding to said snoop response data dirty tags, and
  comparing the write enable strobes corresponding to the snoop response data with said stored write enable strobes,
  generating combined write enable strobes active where said write enable strobes corresponding to the snoop response data are active and said stored write enable strobes are inactive and inactive elsewhere, and
  supplying said snoop response data and said combined write enable strobes to the shared memory causing said shared memory to write data where the corresponding combined write enable strobes are active and not write data where the corresponding combined write enable strobes are inactive.

9. The method of claim 6, wherein:
said step of storing the corresponding coherence write data dirty tags comprises storing dirty tags corresponding to plural coherence write data coherence write data in plural buffer entries together with identity information;
said step of writing to the shared memory portions of snoop response data that is dirty in the snoop response data and clean in the coherence write data comprises matching snoop response data to stored dirty tags via said identity information.

10. The method of claim 9, further comprising:
determining when all other processing cores have responded to a snoop request; and
retiring stored dirty tags when all other processing cores have responded to a snoop request of the corresponding coherence write data.

* * * * *